March 17, 1931.  E. J. ALLEN  1,797,185
STREET CLEANING MACHINE
Filed May 14, 1928
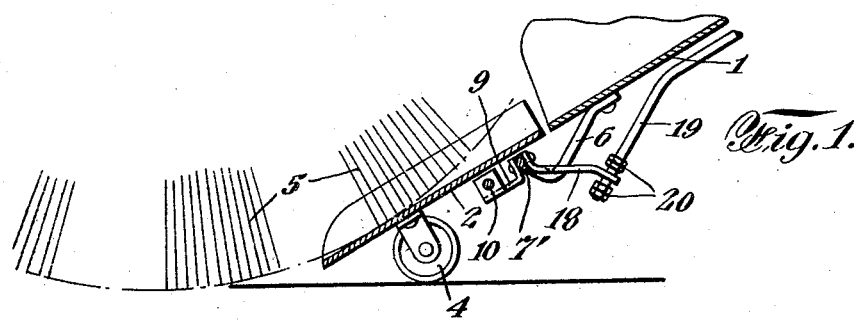
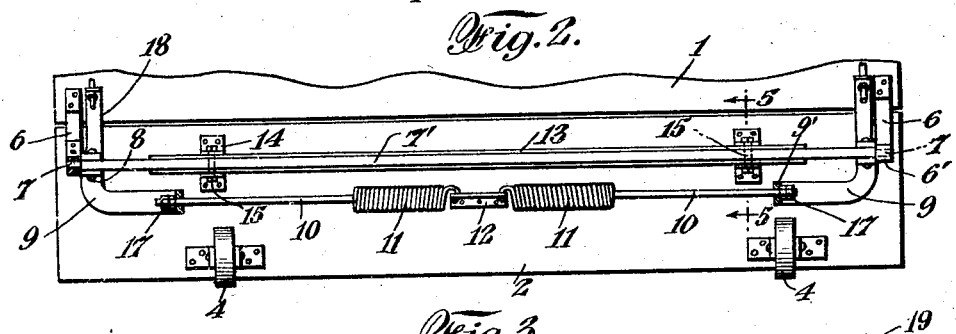
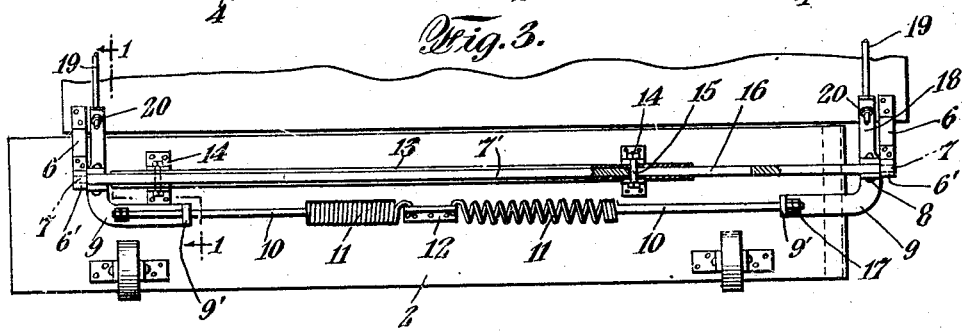
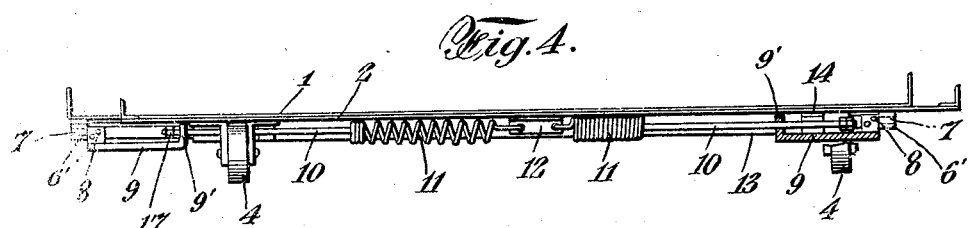
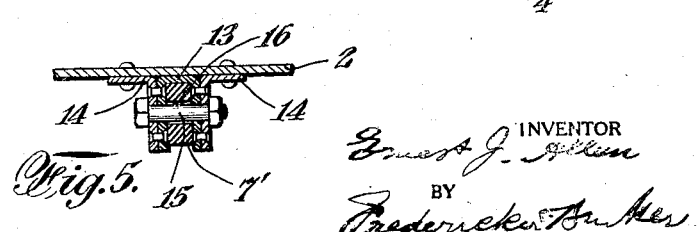

Patented Mar. 17, 1931

1,797,185

UNITED STATES PATENT OFFICE

ERNEST J. ALLEN, OF LONG ISLAND CITY, NEW YORK, ASSIGNOR TO PARROTT DRY PROCESS STREET CLEANER COMPANY, INC., OF NEW YORK, N. Y., A CORPORATION OF DELAWARE

STREET-CLEANING MACHINE

Application filed May 14, 1928. Serial No. 277,637.

This invention relates to street sweeping machines and my improvements are directed to means for rendering laterally yieldable the pan used in directing sweepings from the brush upon the conveyer that carries such sweepings into the receptacle therefor.

In the effective sweeping of streets it is obviously necessary that the revolving brush employed in street sweeping machines must be so mounted in the machine that it can operate closely alongside the curb, and in consequence the pan which co-operates with the brush to deliver the sweepings therefrom to the conveyer must also operate equally closely alongside the curb.

Whereas the brush bristles, being flexible, will yield if brought into contact with the curb, the pan when rigidly mounted is liable to become bent or broken if it should strike the curb, and therefore in order that the pan may be appropriately positioned to co-act with the brush under all conditions of service I cause said pan to be mounted upon the machine in such manner that it is capable of yielding laterally when struck or pressed upon endwise, as by coming into contact with the curb.

Other features and advantages of my invention will hereinafter appear.

In the drawing:—

Figure 1 is a side sectional elevation of my improved laterally movable pan, taken on the line 1—1 of Fig. 3.

Fig. 2 is a bottom plan view of the laterally movable pan, shown in the normal position.

Fig. 3 is a similar view, showing the pan shifted to one side.

Fig. 4 is an end view showing the pan shifted to the other side, and

Fig. 5 is a section taken on the line 5—5 of Fig. 2.

In said views let 1 indicate a fixed pan lying between a laterally yieldable pan 2 and a conveyer (not shown) for delivery of sweepings into a receptacle (not shown) located in the fore part of the machine.

The fixed pan and the conveyer referred to form no part of the present application but are included in another application filed concurrently herewith.

The laterally yieldable pan 2, which is the subject of this application, is mounted on wheels 4, 4 to run along the road surface, and said pan is inclined upwardly from a point near the surface, in advance of the revoluble brush 5, to initially direct the sweepings upwardly. Said pan 2 is co-extensive in length with the brush length, for lengthwise co-operation therewith. Angled brackets 6, 6, secured near the respective ends of the fixed pan 1, at the bottom thereof, are provided with bearings 6', 6' which receive the cylindrical ends 7, 7 of a transverse member 7' that is rectangular in cross-section, said member 7' and the pan 2 being in non-oscillatory relation.

Secured to the member 7', as by bolts 8 at the respective ends of said member, are a pair of angled brackets 9, 9, each having a down-turned flange 9' provided with an orifice for the slidable engagement of a rod 10, said rods respectively engaging the outer ends of coiled springs 11, 11, whose inner ends engage a plate 12 which is secured to the pan 2, centrally of its length.

A sheath 13, U-shaped in cross-section, fits slidably over the transverse member 7', said sheath being secured to pan 2 as by means of angle plates 14 that are bolted respectively to pan 2 and to said sheath. Two pairs of the angle plates 14 are shown as located in spaced relation along the sheath, and each pair carries a bolt 15 that extends transversely across the sheath and lies slidably in a longitudinal slot 16 formed in the transverse member 7'. Hence the pan 2, carrying the sheath 13 and bolt 15 is rendered capable of lateral movement by reason of the travel permitted the bolt 15 in slot 16.

Normally the pan 2 is held in its centered position by means of the rods 10 and springs 11, said rods having heads 17 which co-act with the flanges 9' to limit the inward movement of said rods, whereby, with the springs 11 inert the pan is held normally in its centered position shown in Fig. 2. But when endwise pressure is applied to the pan, as by its striking a curb, the near spring 11 will become extended and the rod 10 at the far side will slide outwardly as the pan shifts laterally under the applied pressure, thereby preventing damage to the pan. As the pressure is released, the tension of the extended spring will restore the parts to their normal position.

Arms 18 attached to member 7' at its outer ends, are each provided with an aperture to slidably receive a rod 19, nuts 20 upon each rod, at opposite sides of arm 18, permitting a sufficient amount of play so that the pan 2 may move vertically as its wheels 4 roll over inequalities of the road surface.

The rod 19 is suitably connected to the machine and when pushed downwardly will cause the pan to be rocked on its axis 7, thus removing wheels 4 from contact with the road when the machine is out of service.

Variations within the spirit and scope of my invention are equally comprehended by the foregoing disclosure.

I claim:

1. The combination with a street sweeping machine having a revoluble brush, of a pan whose length is co-extensive with the brush length, means for oscillatably supporting said pan, and tensional means coupling said supporting means and said pan for permitting said pan to shift laterally in response to endwise pressure thereon independently of said brush.

2. A street cleaning machine including a revoluble brush, a laterally yieldable pan positioned in advance of said brush, a pair of spaced brackets for supporting said pan, each having an apertured flange, a rod slidably mounted in each of said apertured flanges and having a stop at its outer end, and tension means connecting the inner ends of said rods to said pan and adapted to permit lateral movement of the latter in response to endwise pressure thereon.

New York, May 8th, 1928.

ERNEST J. ALLEN.